United States Patent
Tabuchi (10) Patent No.: US 9,266,285 B2
(45) Date of Patent: Feb. 23, 2016

(54) STRUCTURE AND METHOD FOR CLAMPING BUILT-IN COMPONENT IN HOLLOW CONTAINER

(75) Inventor: Naoya Tabuchi, Tochigi (JP)

(73) Assignee: YACHIYO INDUSTRY CO., LTD., Sayama-Shi (JP)

( * ) Notice: Subject to any disclaimer, the term of this patent is extended or adjusted under 35 U.S.C. 154(b) by 960 days.

(21) Appl. No.: 13/327,958

(22) Filed: Dec. 16, 2011

(65) Prior Publication Data

US 2012/0227237 A1    Sep. 13, 2012

(30) Foreign Application Priority Data

Mar. 9, 2011    (JP) .................... 2011-051582

(51) Int. Cl.
 B29C 65/00    (2006.01)
 B29C 51/12    (2006.01)
 (Continued)

(52) U.S. Cl.
 CPC ............... *B29C 66/532* (2013.01); *B29C 51/12* (2013.01); *B29C 51/267* (2013.01); *B29C 65/028* (2013.01); *B29C 65/7814* (2013.01); *B29C 66/126* (2013.01); *B29C 66/1312* (2013.01); *B29C 66/30325* (2013.01); *B29C 66/54* (2013.01); *B29C 66/543* (2013.01);
 (Continued)

(58) Field of Classification Search
 CPC .................... B29C 2049/2013; B65D 25/103; B65D 25/105; B65D 25/107; B60K 15/01; B60K 15/03177; B60K 2015/0346; B60K 2015/03467; B60K 2015/03453
 USPC .................... 24/459; 248/213.2; 249/219.1
 See application file for complete search history.

(56) References Cited

U.S. PATENT DOCUMENTS 5,186,200 A * 2/1993 Kimura et al. ............. 137/15.08
5,394,902 A * 3/1995 Shibao ................. B60K 15/077
                                                     123/509
(Continued)

FOREIGN PATENT DOCUMENTS

CN         1225057 A     8/1999
CN       101080310 A    11/2007
(Continued)

OTHER PUBLICATIONS

European Search Report application No. 11193946.8 dated Aug. 21, 2012.

(Continued)

*Primary Examiner* — Benjamin Schiffman
(74) *Attorney, Agent, or Firm* — Squire Patton Boggs (US) LLP (57) ABSTRACT

The present invention provides a structure for clamping a built-in component in a hollow container, the container being formed by clamp molding using a pair of a first mold piece and a second mold piece, the first mold piece being for forming a first half of the container, the second mold piece being for forming a second half of the container, the structure comprising: a first support member secured to an inner wall surface of the first half of the container and having a first connection portion and a first clamp portion; a second support member secured to an inner wall surface of the second half of the container having a second connection portion and a second clamp portion, wherein the built-in component is clamped between the first support member and the second support member with the first connection portion and the second connection portion coupled to each other.

2 Claims, 7 Drawing Sheets

(51) Int. Cl.
  *B29C 51/26* (2006.01)
  *B29C 65/02* (2006.01)
  *B29C 65/78* (2006.01)
  *B29C 69/00* (2006.01)
  *B29D 22/00* (2006.01)
  *B60K 15/03* (2006.01)
  *B29C 49/04* (2006.01)
  *B29C 49/22* (2006.01)
  *B29C 49/00* (2006.01)
  *B29C 49/20* (2006.01)
  *B29K 23/00* (2006.01)
  *B29K 105/20* (2006.01)
  *B29K 659/00* (2006.01)
  *B29L 22/00* (2006.01)
  *B29L 31/30* (2006.01)
  *B29L 31/00* (2006.01)

(52) U.S. Cl.
  CPC .......... *B29C 66/61* (2013.01); *B29C 66/92655* (2013.01); *B29C 69/004* (2013.01); *B29D 22/003* (2013.01); *B29C 49/04* (2013.01); *B29C 49/22* (2013.01); *B29C 66/3494* (2013.01); *B29C 66/71* (2013.01); *B29C 66/712* (2013.01); *B29C 66/7234* (2013.01); *B29C 66/8242* (2013.01); *B29C 66/8322* (2013.01); *B29C 66/83221* (2013.01); *B29C 66/919* (2013.01); *B29C 66/91411* (2013.01); *B29C 66/92445* (2013.01); *B29C 2049/0057* (2013.01); *B29C 2049/2008* (2013.01); *B29C 2049/2013* (2013.01); *B29C 2049/2047* (2013.01); *B29C 2049/2078* (2013.01); *B29C 2791/001* (2013.01); *B29C 2791/006* (2013.01); *B29C 2791/007* (2013.01); *B29K 2023/065* (2013.01); *B29K 2105/203* (2013.01); *B29K 2659/00* (2013.01); *B29L 2022/00* (2013.01); *B29L 2031/30* (2013.01); *B29L 2031/7172* (2013.01); *B60K 15/03177* (2013.01); *B60K 2015/03032* (2013.01); *B60K 2015/0346* (2013.01); *B60K 2015/03453* (2013.01); *B60K 2015/03467* (2013.01); *Y10T 29/49826* (2015.01)

(56) References Cited

U.S. PATENT DOCUMENTS

| | | | | |
|---|---|---|---|---|
| 6,338,420 | B1* | 1/2002 | Pachciarz | B60K 15/03177 220/4.13 |
| 6,786,350 | B2* | 9/2004 | Bauer | B60K 15/077 220/563 |
| 7,037,025 | B2* | 5/2006 | Takahashi | F16B 5/123 24/24 |
| 7,455,190 | B2* | 11/2008 | Potter | B60K 15/03177 220/4.12 |
| 7,922,949 | B2* | 4/2011 | Borchert et al. | 264/250 |
| 8,151,768 | B2* | 4/2012 | Kaneda et al. | 123/519 |
| 2001/0009257 | A1* | 7/2001 | Bauer | B60K 15/077 220/563 |
| 2003/0038136 | A1* | 2/2003 | Bauer | B60K 15/077 220/563 |
| 2005/0016600 | A1* | 1/2005 | Knaggs | B60K 15/03519 137/590 |
| 2006/0102634 | A1* | 5/2006 | Potter | B60K 15/03177 220/562 |
| 2009/0230133 | A1* | 9/2009 | Takeuchi | B60K 15/03 220/562 |
| 2010/0116366 | A1* | 5/2010 | Gattozzi | B29C 49/20 137/587 |
| 2010/0224440 | A1* | 9/2010 | Fujii | B60K 15/077 181/233 |
| 2011/0226777 | A1* | 9/2011 | Asahara | B60K 15/03177 220/562 |
| 2012/0138606 | A1 | 6/2012 | Varga | |
| 2012/0152449 | A1* | 6/2012 | Watanabe | B29C 66/83221 156/245 |
| 2013/0220999 | A1* | 8/2013 | Usui | B60K 15/03177 220/4.14 |

FOREIGN PATENT DOCUMENTS

| | | |
|---|---|---|
| CN | 101448664 A | 6/2009 |
| DE | 19627742 A1 | 1/1998 |
| DE | 102009036911 A1 | 2/2011 |
| JP | 05-008288 A | 1/1993 |
| JP | 2009-542480 A | 12/2009 |
| WO | 2006/064004 A1 | 6/2006 |
| WO | 2007/131974 A1 | 11/2007 |
| WO | 2008/003387 A1 | 1/2008 |

OTHER PUBLICATIONS

Chinese Office Action application No. 201110421690.4 dated Dec. 10, 2013.

* cited by examiner

STRUCTURE AND METHOD FOR CLAMPING BUILT-IN COMPONENT IN HOLLOW CONTAINER

CROSS-REFERENCE TO RELATED APPLICATION

This application claims the foreign priority benefit under 35 U.S.C. §119 of Japanese Patent Application No. 2011-051582 filed on Mar. 9, 2011 in the Japan Patent Office, the disclosure of which is incorporated herein by reference in its entirety.

BACKGROUND OF THE INVENTION

1. Field of the Invention

The present invention relates to a structure and method for clamping a built-in component in a resin-made hollow container such as a vehicle fuel tank.

2. Description of the Invention

A vehicle fuel tank includes various built-in components associated with the tank such as a valve, a pump, and a tube. For securing such built-in components to an inner wall of the tank body, it is preferable to secure them during a step of manufacturing the tank body rather than after completion of the tank body when considering the labor involved in operations for incorporating the built-in components into the completed tank body.

Examples of conventional methods of securing such components in a tank during manufacture of the tank include a method disclosed in JP 2009-542480. JP 2009-542480 describes a technique of securing a pair of support members respectively against inner walls of parisons (two shells) transferred onto mold pieces, by means of an air cylinder; causing the support members to respectively hold ducts that have a connector plug portion and a connector socket portion, respectively; and coupling the connector plug portion and the connector socket portion to each other when closing the mold pieces and thereby connecting the ducts to each other for communication.

In the technique of JP 2009-542480, when the ducts are properly put into communication, it is considered that the ducts are stably secured to the tank by being supported by the pair of support members. However, when an axial displacement of the ducts occurs during the connection thereof, the connector plug portion and the connector socket portion collide with each other. As a result, the ducts might drop from the support members without the communication established between the ducts.

The present invention has been made to solve the above drawback. It is an object of the present invention to provide a structure and method for stably securing a built-in component such as a duct in a hollow container such as a fuel tank.

SUMMARY OF THE INVENTION

In one aspect of the present invention, there is provided a structure for clamping a built-in component in a hollow container, the container being formed by mold clamping using a pair of a first mold piece and a second mold piece, the first mold piece being for forming a first half of the container, the second mold piece being for forming a second half of the container, the structure comprising: a first support member secured to an inner wall surface of the first half of the container and having a first connection portion and a first clamp portion; a second support member secured to an inner wall surface of the second half of the container having a second connection portion and a second clamp portion, wherein the built-in component is clamped between the first clamp portion and the second clamp portion in the state that the first connection portion and the second connection portion are coupled to each other.

In another aspect, there is provided a method for clamping a built-in component in a hollow container, the container being formed by mold clamping using a pair of a first mold piece and a second mold piece, the first mold piece being for forming a first half of the container, the second mold piece being for forming a second half of the container, the container including: a first support member secured to an inner wall surface of the first half of the container and having a first connection portion and a first clamp portion; and a second support member secured to an inner wall surface of the second half and having a second connection portion and a second clamp portion; wherein the method comprises clamping the built-in component between the first clamp portion and the second clamp portion in the state that the first connection portion and the second connection portion are coupled to each other.

According to the structure and method for clamping the built-in component in the hollow container of the present invention, the built-in component can be stably secured to the hollow container via the first support member and the second support member that are coupled to each other.

The structure for clamping the built-in component in the hollow container according to the present invention may further comprise a lateral shift prevention means provided between the built-in component and at least either one of the first clamp portion and the second clamp portion for preventing lateral shift of the built-in component.

By providing the lateral shift prevention means between the built-in component and at least either one of the first clamp portion and the second clamp portion, lateral shift of the built-in component can be prevented. Otherwise, the lateral shift may occur in the case when the built-in component is clamped only with a clamping force generated between the first clamp portion and the second clamp portion.

The method for clamping the built-in component in the hollow container according to the present invention may further comprise temporarily placing the built-in component on either one of the first clamp portion and the second clamp portion before clamping the built-in component.

By temporarily placing the built-in component on either one of the first clamp portion and the second clamp portion before clamping the built-in component, it is possible to avoid, when clamping the built-in component, a potential improper abutment between the built-in component and either one of the first clamp portion and the second clamp portion on which the built-in component is temporarily placed.

DETAILED DESCRIPTION OF THE PREFERRED EMBODIMENTS

A hollow container intended in the present invention is, for example, a blow molded article for a vehicle fuel tank. FIGS. 1A-1F show a procedure to form a fuel tank T by mold clamping using a pair of a first mold piece F and a second mold piece F.

A structure for clamping a built-in component in a hollow container according to the present invention is mainly characterized by including a first support member 1 and a second support member 2. The first support member 1 is secured to a wall of a first half of the container (a wall of a first half of the fuel tank T) formed by using the first mold piece F. The second support member 2 is secured to a wall of a second half of the container formed by using the second mold piece F. The first support member 1 has a first connection portion 3 and a first clamp portion 4. The second support member 2 has a second connection portion 5 and a second clamp portion 6. Further, the structure is also characterized in that a built-in component 7 is clamped between the first clamp portion 4 and the second clamp portion 6 in the state that the first connection portion 3 and the second connection portion 5 are coupled to each other.

In the present invention, the description that the built-in component 7 is "clamped" means that the built-in component 7 is sandwiched between the first support member 1 and the second support member 2 in two opposite directions to each other by 180°. Accordingly, the built-in component 7 is unable to move at least in the two opposite directions.

FIGS. 1A-1F show an embodiment in which the first support member 1 comprises a pair of a first support member 1A and a first support member 1B, the second support member 2 comprises a pair of a second support member 2A and a second support member 2B, and the built-in component 7 comprises a tube 7A and a support shaft 7B. Herein, the first support member 1A and the second support member 2A are paired to clamp the tube 7A. Similarly, the first support member 1B and the second support member 2B are paired to clamp the support shaft 7B.

Examples of materials of the first support member 1 and the second support member 2 include, for example, POM (polyacetal resin). Each of the first support member 1 and the second support member 2 has, for example, a cylindrical shape and may be a hollow member or a solid member. The fuel tank T has a sectional multilayered structure in which a barrier layer made of a material with a high impermeability to fuel is sandwiched between at least a thermoplastic resin inner layer and a thermoplastic resin outer layer. Herein, the thermoplastic resin inner layer constitutes an inner surface of the fuel tank T and the thermoplastic resin outer layer constitutes an outer surface thereof. The thermoplastic resin inner layer and the thermoplastic resin outer layer are each made of, for example, PE (high-density polyethylene) excellent in heat fusion and molding properties.

Figure 1A:
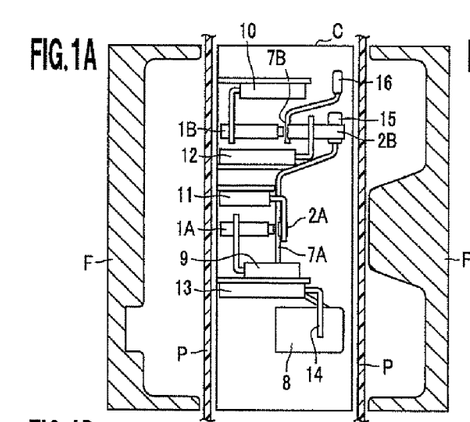
FIGS. 1A-1F are explanatory views showing a procedure to form a hollow container, the hollow container shown from the side thereof.
Figure 1B:
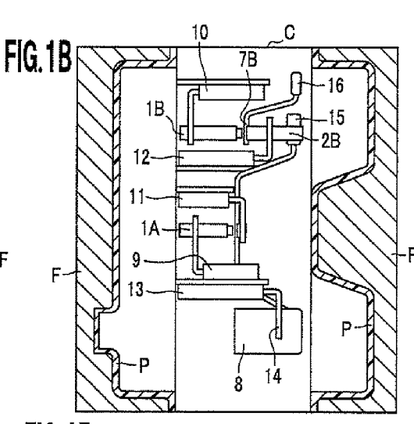

Now, descriptions will be made of the procedure to form the fuel tank T. FIG. 1A shows a state in which the mold pieces F,F are opened and a center frame C is positioned between the opened mold pieces F,F. A pair of a pair of plate-like first and second parisons P,P, are hung each between the respective mold pieces F,F and the center frame C. The center frame C is provided with cylinders 9, 10, 11, 12, 13. The cylinders 9, 10 serve as actuators for securing the first support members 1A,1B to the first parison P. The cylinders 11, 12, 13 serve as actuators for securing the second support members 2A, 2B and a fuel pump 8 to the second parison P. The cylinders 9-13 have rods, respectively, that are provided with releasable holding mechanisms 14 at top ends thereof, respectively. The releasable holding mechanisms 14 hold the first support members 1A, 1B, the second support members 2A, 2B and the fuel pump 8, respectively. In FIG. 1A, the rods of the cylinders 9-13 are in the retracted state. Each holding mechanism 14 is a well-known mechanism such as a retaining clamp, and thus, detailed description thereof is omitted since it is irrelevant to an understanding of the present invention.

The fuel pump 8 is for supplying fuel from the inside of the fuel tank T, and has a substantially cylindrical shape. The fuel pump 8 has a base end secured to the second parison P. Also, the fuel pump 8 has a top end that faces an area of the first parison P to be an opening (which is to be opened in a later step) Tc of the fuel tank T. An outlet (not illustrated) for the fuel is formed at the top end of the fuel pump 8. Connected to the outlet in a later step is, for example, piping that extends through the opening Tc to the outside for supplying the fuel to the outside. The tube 7A is attached to a peripheral surface of the base end side of the fuel pump 8. The tube 7A has a strainer 15 at a top end thereof. After foreign matter is removed from the fuel by the strainer 15, the fuel is passed through the tube 7A and then sucked by the fuel pump 8 into the piping. Through this piping, the fuel is supplied to the outside. The tube 7A is temporarily placed on the second clamp portion 6 of the second support member 2A.

A float 16 is attached to a top end of the support shaft 7B so as to float on the fuel surface. The support shaft 7B has a base end portion temporarily placed on the second clamp portion 6 of the second support member 2B in a rotatable manner. The support shaft 7B includes, for example, an electrical connecting portion, not illustrated. The float 16 goes up and down with the fuel surface level, and this movement of the float 16 causes the support shaft 7B to pivot. The pivotal movement of the support shaft 7B, in turn, causes the electrical connecting portion to slide along a resistor or the like provided on the second support member 2B for outputting to an external circuit an electric signal that is commensurate with the fuel surface level.

Figure 1C:
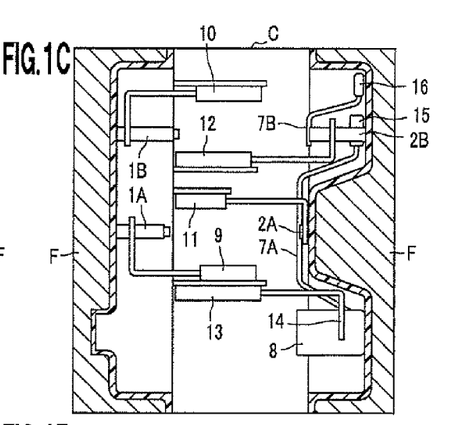
Figure 1D:
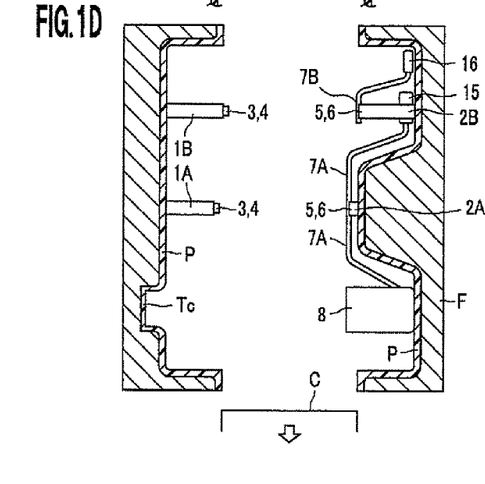

Now, the description of the procedure to form the fuel tank T will be resumed. The mold pieces F,F are moved from the state shown in FIG. 1A and thereby closed with the center frame C sandwiched therebetween. Then, a vacuum is drawn from a mold surface side of the closed mold F to transfer the parisons P,P onto the mold surface of the closed mold F (the state shown in FIG. 1B). Next, as shown in FIG. 1C, the rods of the cylinders 9-13 are advanced horizontally by a predetermined length so that the respective base ends of the first support members 1A, 1B, the second support members 2A, 2B and the fuel pump 8 are pressed against the parisons P,P and embedded therein to a predetermined depth. Then, the first support members 1A, 1B, the second support members 2A, 2B and the fuel pump 8 are released by the holding mechanisms 14, the rods of the cylinders 9-13 are retracted, the mold pieces F,F are opened, and subsequently, the center frame C is withdrawn from between the mold pieces F,F (the state shown in FIG. 1D).

Figure 1E:
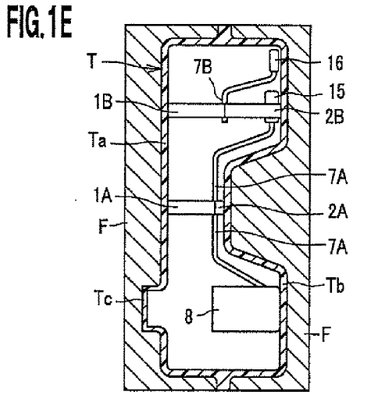
Figure 1F:
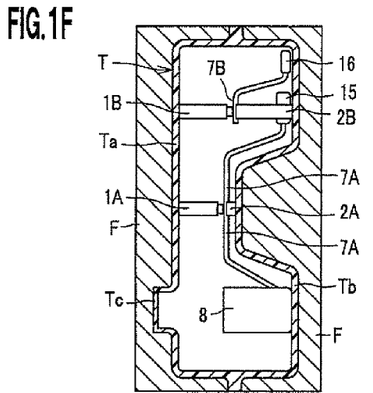

Next, as shown in FIG. 1E and FIG. 1F, the mold pieces F,F are closed again to define a cavity inside them. Then, air is blown into the cavity to form the parisons P,P into the shape of the fuel tank T. The first parison P constitutes an upper surface part Ta of the fuel tank T, whereas the second parison P constitutes a lower surface part Tb of the fuel tank T. FIG. 1E shows a state in which the first connection portion 3 of the first support member 1A and the second connection portion 5 of the second support member 2A are coupled to each other, and the first connection portion 3 of the first support member 1B and the second connection portion 5 of the second support member 2B are coupled to each other, at the time when the mold pieces F,F are closed for the mold clamping. At this time, the tube 7A which is temporarily placed on the second clamp portion 6 of the second support member 2A is clamped between the second clamp portion 6 of the second support member 2A and the first clamp portion 4 of the first support member 1A, whereas the support shaft 7B which is temporarily placed on the second clamp portion 6 of the second support member 2B is clamped between the second clamp portion 6 of the second support member 2B and the first clamp portion 4 of the first support member 1B.

If the tube 7A is clamped simultaneously by the second clamp portion 6 and by the first clamp portion 4 without temporarily placing the tube 7A on the second clamp portion 6 of the second support member 2A, this may cause an improper abutment between the tube 7A and each or either one of the second clamp portion 6 and the first clamp portion 4 when a positional displacement occurs therebetween. In contrast, if the tube 7A is temporarily placed on the second clamp portion 6 before being clamped, such a potential improper abutment can be avoided between the tube 7A and at least the second clamp portion 6 on which the tube 7A is temporarily placed.

Likewise, when the support shaft 7B is temporarily placed on the second clamp portion 6 before it is clamped, a potential improper abutment can be avoided between the support shaft 7B and at least the second clamp portion 6.

On the other hand, FIG. 1F shows a state in which the first connection portion 3 of the first support member 1A and the second connection portion 5 of the second support member 2A are left uncoupled and the first connection portion 3 of the first support member 1B and the second connection portion 5 of the second support member 2B are left uncoupled, at the time when the mold pieces F,F are closed for the mold clamping. Thus, in FIG. 1F, the tube 7A is not yet clamped between the second clamp portion 6 of the second support member 2A and the first clamp portion 4 of the first support member 1A, and the support shaft 7B is not yet clamped between the second clamp portion 6 of the second support member 2B and the first clamp portion 4 of the first support member 1B.

For the state shown in FIG. 1F, there are additionally provided steps of coupling the support members (hereinafter, referred to as the "coupling procedure" by using a correction jig 17 shown in FIGS. 2A-2C. In the coupling steps, while the fuel tank T is being allowed to cool after being removed from the mold pieces F,F (FIG. 1A-1F), the correction jig 17 presses the outer surface of the fuel tank T to deform the fuel tank T and thereby to couple the first support member 1A and the second support member 2A to each other and couple the first support member 1B and the second support member 2B to each other. Here, it should be noted that illustrations of pinch-off portions of the fuel tank T are omitted in FIGS. 2A-2C.

Figure 2A:
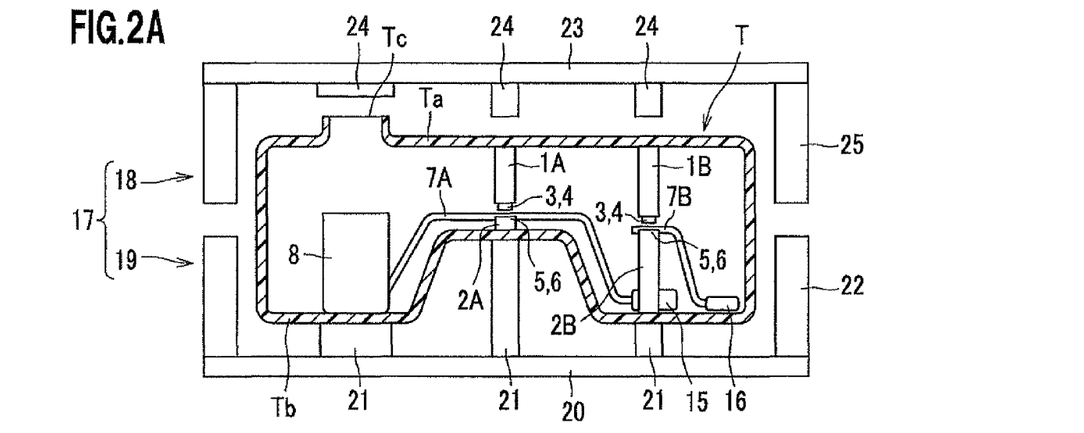
FIGS. 2A-2C are explanatory views showing a procedure to couple a first support member and a second support member to each other by using a correction jig, the first support member and the second support member shown from the side thereof.
Figure 2B:
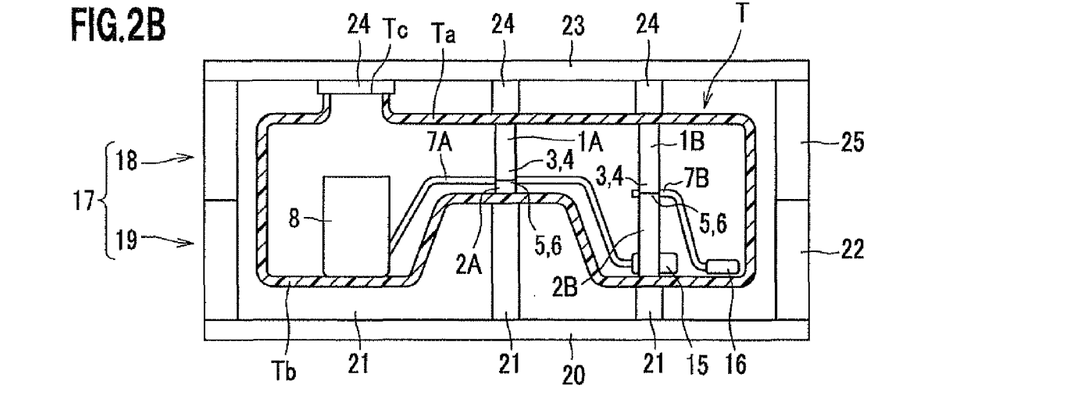
Figure 2C:
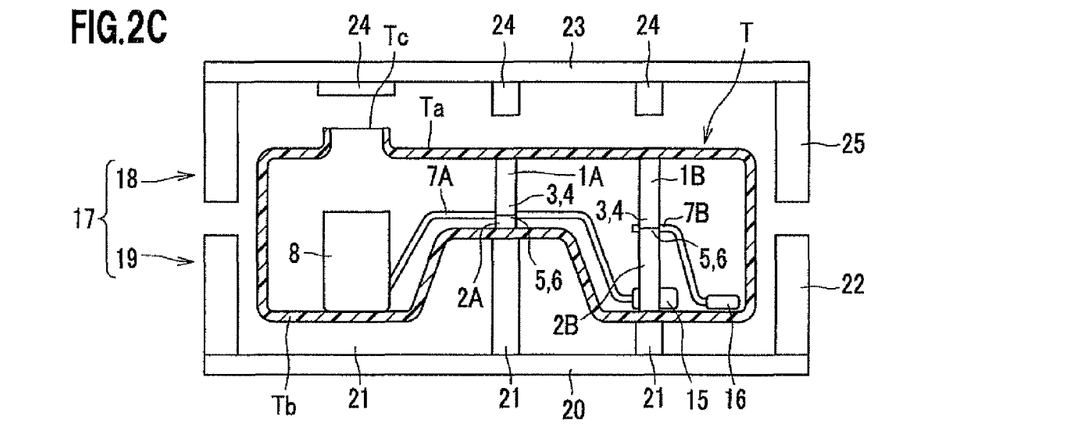

The fuel tank T removed from the mold pieces F,F (which are shown in FIGS. 1A-1F) is transferred into the correction jig 17 shown in FIGS. 2A-2C. This transfer of the fuel tank T from the mold pieces F,F into the correction jig 17 may be made either automatically, for example, by means of a robot, a conveyor or the like, or manually. The fuel tank T immediately after removed from the mold pieces F,F has a surface temperature ranging from approximately 80° C. to approximately 120° C. This means that in the case where the fuel tank T is transferred manually, an operator needs to wear work gloves or the like in handling the fuel tank T.

There is no particular limitation on the structure of the correction jig 17 as long as it has a function of pressing the outer surface of the fuel tank T to couple the first support member 1A and the second support member 2A to each other and to couple the first support member 1B and the second support member 2B to each other. The correction jig 17 of FIGS. 2A-2C is constituted of a movable upper jig 18 and a fixed lower jig 19. The upper jig 18 can move up and down. The lower jig 19 includes a fixed base 20 and a plurality of discrete pressing mounts 21. The pressing mounts 21 are provided on the fixed base 20 for placing the lower surface part Tb thereon. Two of the pressing mounts 21 carry areas of the lower surface part Tb, those areas being bearing surfaces to which the second support members 2A, 2B are secured and surrounding areas thereof. The fixed base 20 is provided with stoppers 22 for determining the lowest position to which the upper jig 18 is allowed to move down.

The upper jig 18 includes a movable base 23 and a plurality of pressing portions 24. The movable base 23 is moved up and down by an actuator such as a cylinder, not illustrated. The plurality of pressing portions 24 are provided at a lower surface of the movable base 23 for pressing the upper surface part Ta when the movable base 23 is moved down. Two of the pressing portions 24 press areas of the upper surface part Ta that are bearing surfaces to which the first support members 1A, 1B are secured and surrounding areas thereof. The movable base 23 is provided with stoppers 25. The stoppers 25 abut on the stoppers 22.

There will be described one example of the coupling steps that uses the correction jig 17. The fuel tank T, removed from the mold pieces F,F (FIG. 1) and having a surface temperature ranging from approximately 80° C. to approximately 120° C., is placed on the pressing mounts 21 of the lower jig 19, with the upper jig 18 lifted up, as shown in FIG. 2A. In this state, the first support member 1A and the second support member 2A are not yet coupled to each other with a gap formed therebetween and the first support member 1B and the second support member 2B are not yet coupled to each other with a gap formed therebetween. Then, as shown in FIG. 2B, the upper jig 18 is kept moving down until the stoppers 22 and the stoppers 25 abut on each other. The two of the pressing portions 24 press the areas of the upper surface part Ta that are the bearing surfaces to which the first support members 1A, 1B are secured and the surrounding areas thereof, and the two of the pressing mounts 21 press the areas of the lower surface part Tb that are the bearing surfaces to which the second support members 2A, 2B secured and the surrounding areas thereof. As a result, those areas of the upper surface part Ta and those areas of the lower surface part Tb are corrected and deformed, whereby the first support member 1A and the second support member 2A are coupled to each other and the first support member 1B and the second support member 2B are coupled to each other. At this time, the tube 7A is clamped between the first clamp portion 4 of the first support member 1A and the second clamp portion 6 of the second support member 2A, and the support shaft 7B is clamped between the first clamp portion 4 of the first support member 1B and the second clamp portion 6 of the second support member 2B.

The cooling in the coupling steps is, for example, natural cooling in an ambient air. Here, the fuel tank T during the coupling steps has still a surface temperature ranging from approximately 80° C. to approximately 120° C. This allows the outer shape of the fuel tank T of a thermoplastic resin material to be sufficiently corrected and deformed. The duration for the upper jig 18 to stay at the lowest position, that is, the duration for the two of the pressing portions 24 and the two of the pressing mounts 21 to keep pressing the fuel tank T, is set properly for ensuring completion of the correction and deformation of the outer shape of the fuel tank T made of a thermoplastic resin material. In other words, at completion of the correction and deformation, there is no spring back occurring at those pressed areas of the upper surface part Ta that are the bearing surfaces and the surrounding areas thereof and at those pressed areas of the lower surface part Tb that are the bearing surfaces and the surrounding areas thereof. This results in firm couplings formed between the first support members 1A, 1B and the second support members 2A, 2B. It should be noted that in some cases, there may be carried out a treatment such as blowing a cooling air to the fuel tank T. After the lapse of the duration for the upper jig 18 to keep staying at the lowest position, the upper jig 18 is moved up as shown in FIG. 2C, and the fuel tank T is removed form the pressing mounts 21 and transferred for the next step.

Figure 3A:
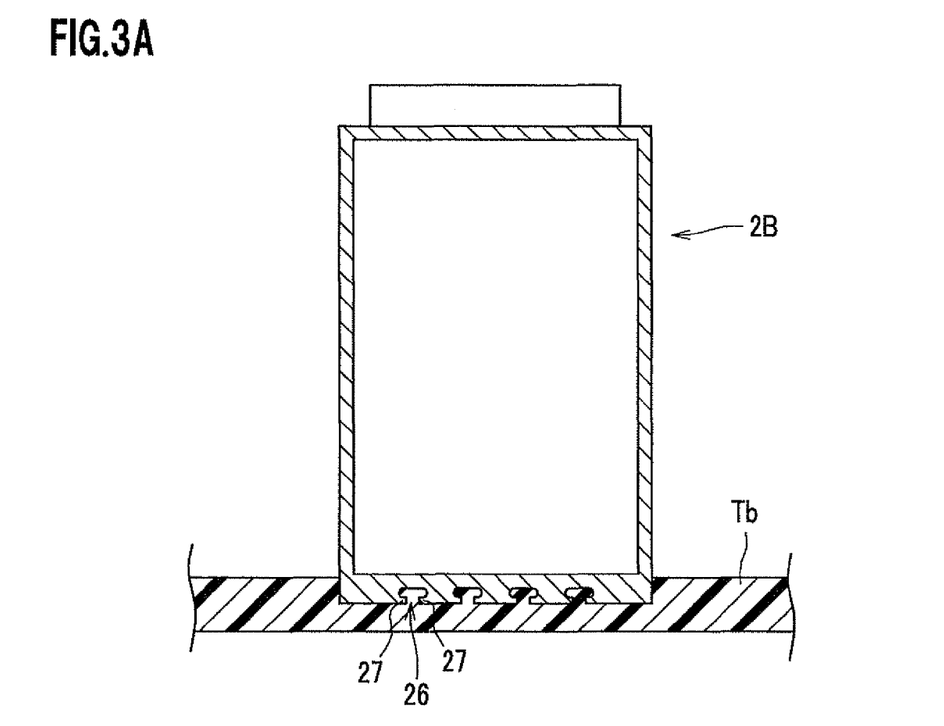
FIGS. 3A and 3B are views showing one example of a base end surface of the second support member, FIG. 3A being a side view of the second support member, FIG. 3B being an external perspective view of the second support member.
Figure 3B:
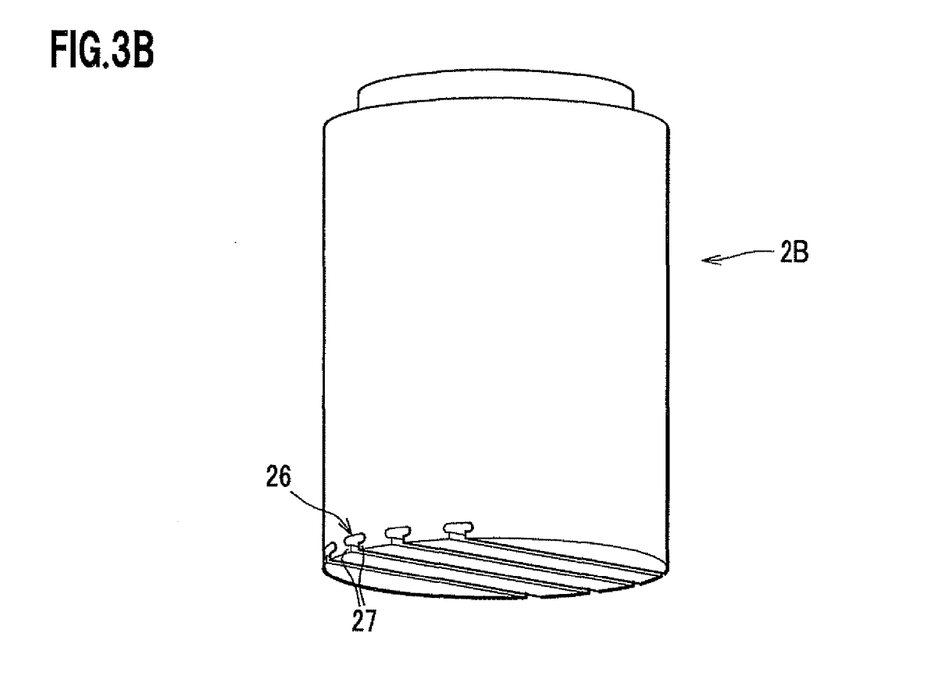

Now, there will be described an example of a configuration of a base end surface of each of the first support member 1 and the second support member 2. FIGS. 3A and 3B show an example of a configuration of a base end surface of the second support member 2B. The base end surface of the second support member 2B is formed with a pair of hook portions 27. The hook portions 27 have hook tips opposed to each other to form a resin inflow groove 26 with a narrow opening. FIGS. 3A and 3B show an embodiment in which the pair of hook portions 27 comprises four pairs of hook portions 27 arranged in parallel to each other to form four resin inflow grooves 26. Each hook portion 27 has a linear predetermined cross section. In the procedure to form the fuel tank T shown in FIGS. 1A-1F, when the base end of the second support member 2B is pressed against the parison P, part of the parison P flows into the resin inflow grooves 26, thereby firmly fixing the second support member 2B to the parison P (that is, the lower surface part Tb) because of the mechanical coupling force applied by the pair of hook portions 27. This prevents inclination of the second support member 2B even in the steps of FIGS. 1A-1F in which the parison P has a high fluidity. The first support members 1A, 1B and the second support member 2A are also formed with the resin inflow grooves 26 and the hook portions 27 at the base end surfaces thereof so that the first support members 1A, 1B and the second support member 2A can be firmly fixed to the parisons P,P. Further, the fuel pump 8 is formed with the resin inflow grooves 26 and the hook portions 27 at the base end surface thereof. This prevents the fuel pump 8 from being inclined during the steps of FIGS. 1A-1F even if the fuel pump 8 has a comparatively heavy weight.

Figure 4A:
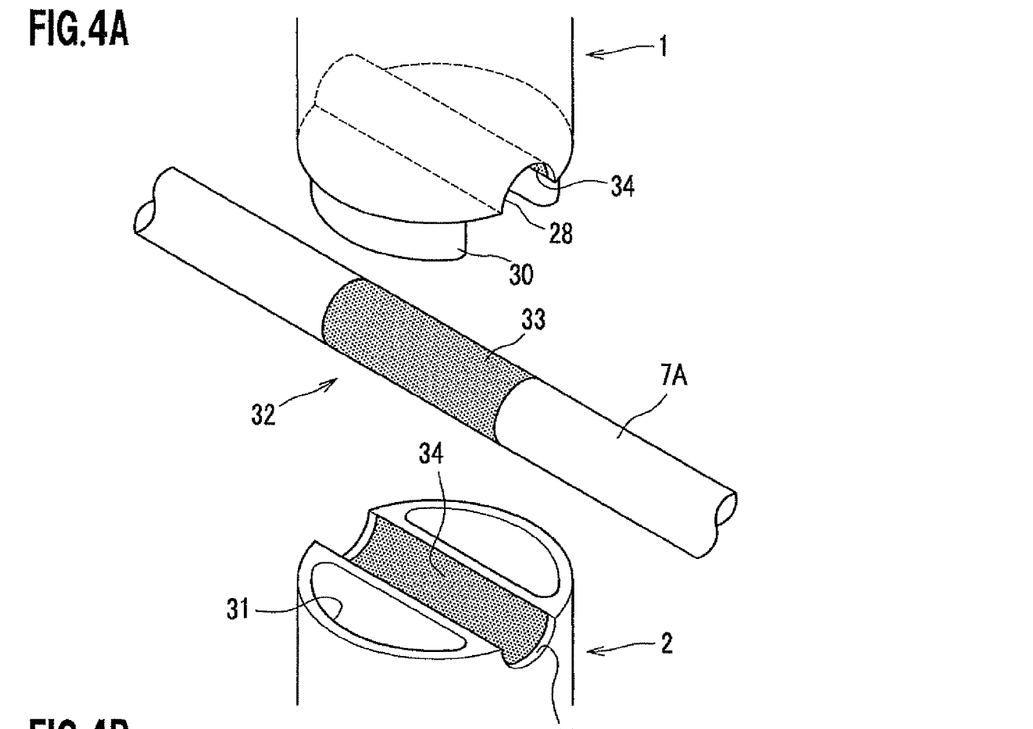
FIGS. 4A and 4B are views of one embodiment of a structure for coupling the first support member and the second support member to each other and a structure for clamping a built-in component, FIG. 4A being an external perspective view of the first support member and the second support member, FIG. 4B being a side view thereof.
Figure 4B:
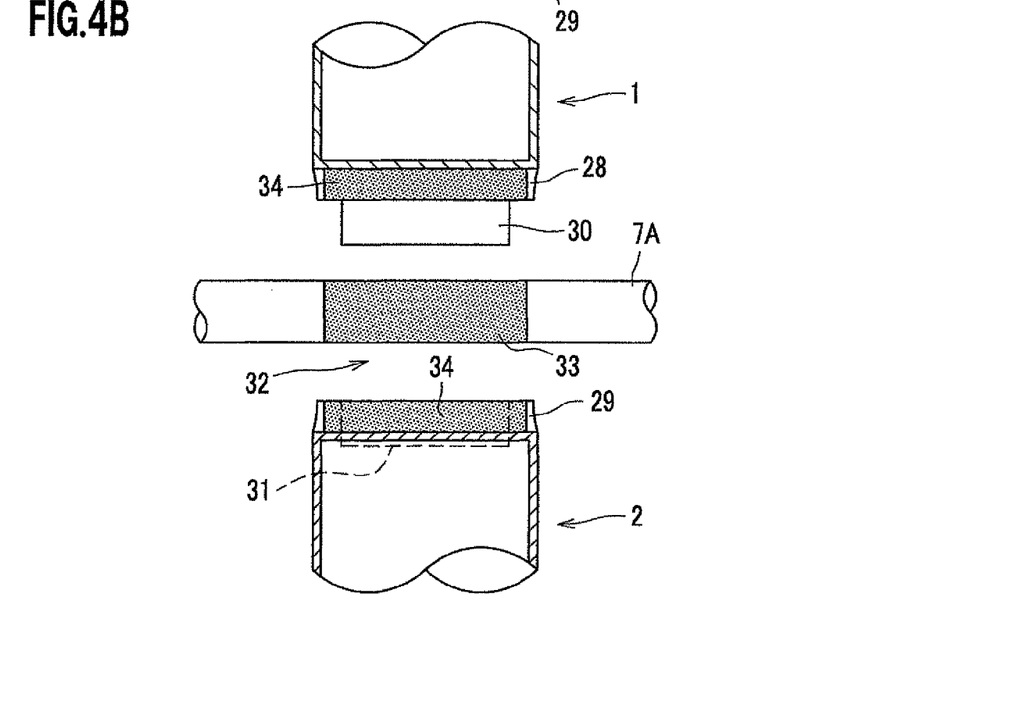

Next, there will be described a specific example of a structure to couple the first support member 1 and the second support member 2 to each other and a specific example of a structure to clamp the built-in component 7. In FIGS. 4A and 4B, the built-in component 7 is embodied as the tube 7A. The first support member 1 and the second support member 2 have top end surfaces, respectively, and these top end surfaces have grooves 28 and 29, respectively. The grooves 28 and 29 have semi-circular cross sections, respectively, and these semi-circular cross sections are provided in parallel to each other to fit an upper circumferential surface and a lower circumferential surface, respectively, of the tube 7A. The grooves 28 and 29 extend across the diameter of the top end surfaces of the first support member 1 and the second support member 2, respectively. The top end surface of the first support member 1 is provided with a pair of coupling projections 30 with the groove 28 therebetween, whereas the top end surface of the second support member 2 is provided with a pair of coupling recesses 31, with the groove 29 therebetween, for the coupling projections 30 to fit in. The coupling projections 30 as a pair constitute the first connection portion 3, whereas the coupling recesses 31 as a pair constitute the second connection portion 5. The groove 28 constitutes the first clamp portion 4, whereas the groove 29 constitutes the second clamp portion 6. It should be noted that the second support member 2, instead of the first support member 1, may have the pair of coupling projections 30, while the first support member 1, instead of the second support member 2, may have the pair of coupling recesses 31.

With the above arrangement, the pair of coupling projections 30 fit in the pair of coupling recesses 31 to cause the top end surfaces of the first support member 1 and the second support member 2 to abut against each other. Thus, the first support member 1 and the second support member 2 are coupled to each other. As a result, the tube 7A is clamped between the grooves 28 and 29, with the outer circumferential surface of the tube 7A fitting with the semi-circular cross sections of the grooves 28 and 29. Thus, the tube 7A held between the first support member 1 and the second support member 2 is unable to move at least in a direction perpendicular to the axial direction of the tube 7A. The first support member 1 and the second support member 2 thus coupled to each other constitute a rigid column to support the upper surface part Ta and the lower surface part Tb of the fuel tank T shown in FIGS. 1A-1F. This restrains shrink deformation of the fuel tank T in a direction between the upper surface part Ta and the lower surface part Tb.

FIGS. 4A and 4B show an embodiment in which a lateral shift prevention means 32 is provided between at least each of the grooves 28 and 29 and the tube 7A. The lateral shift prevention means 32 is for preventing lateral shift of the tube 7A, that is, shift of the tube 7A in an axial direction thereof. The lateral shift prevention means 32 may be constituted of a component 33 embodied as a magnet secured around the outer circumferential surface of the tube 7A and component 34 embodied as magnets secured on the respective surfaces of the groove 28 and the groove 29. The component 34 embodied as a magnet has a magnetic polarity to adhere to the component 33 embodied as a magnet. Due to a magnetic force of each of the components 33 and 34 embodied as magnets, the tube 7A is positioned in place with regard to the axial direction thereof. The component 34 embodied as a magnet may be provided on only either one of the groove 28 and the groove 29.

Also, the lateral shift prevention means 32 facilitates temporary placement of the tube 7A on either one of the second support members 2 (for example, the second clamp portion 6 of the second support member 2A) before clamping the tube 7A. In the embodiment of FIGS. 4A and 4B, the magnetic force of the components 33 and 34 embodied as magnets facilitates temporary placement of the tube 7A on either one of the second support members 2.

The lateral shift prevention means 32 may be embodied as a hook-and-loop fastener, and the component 33 may be embodied as the hooks and the component 34 may be embodied as the loops. That is, the hook-and-loop fastener is constituted of the component 33 as hooks secured around the outer circumferential surface of the tube 7A and the component 34 as loops secured on the respective surfaces of the groove 28 and the groove 29. The loops catch in the hooks when the component 33 embodied as hooks and the component 34 embodied as loops are pressed to each other to position the tube 7A in place with regard to the axial direction thereof. The component 34 embodied as loops may be provided on only either one of the groove 28 and the groove 29. In such a case also, the fastening of the component 33 embodied as hooks and the component 34 embodied as loops facilitates temporary placement of the tube 7A on either one of the second support members 2.

Figure 5A:
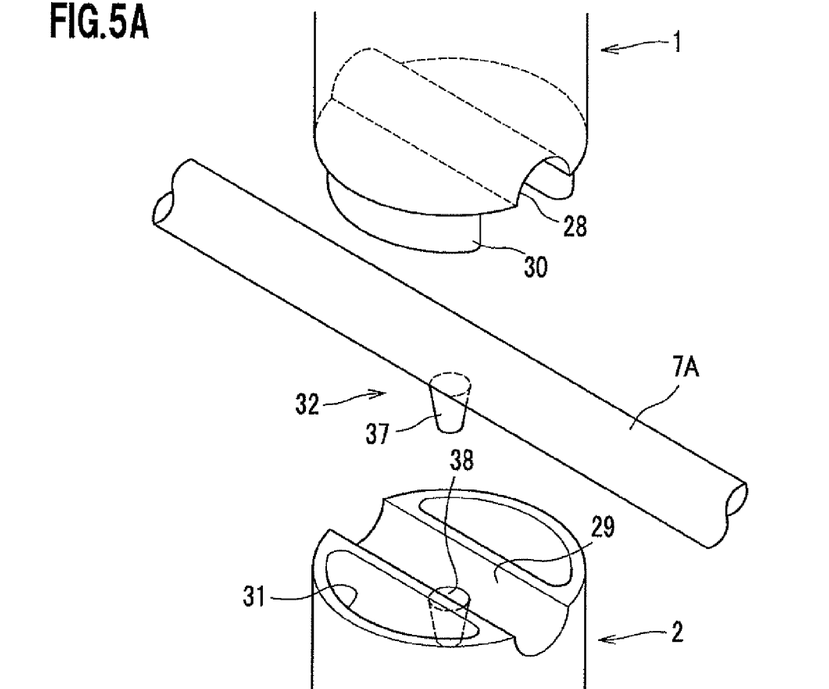
FIGS. 5A and 5B are views of another embodiment of the structure for coupling the first support member and the second support member to each other and the structure for clamping the built-in component, FIG. 5A being an external perspective view of the first support member and the second support member, FIG. 5B being a side view thereof.
Figure 5B:
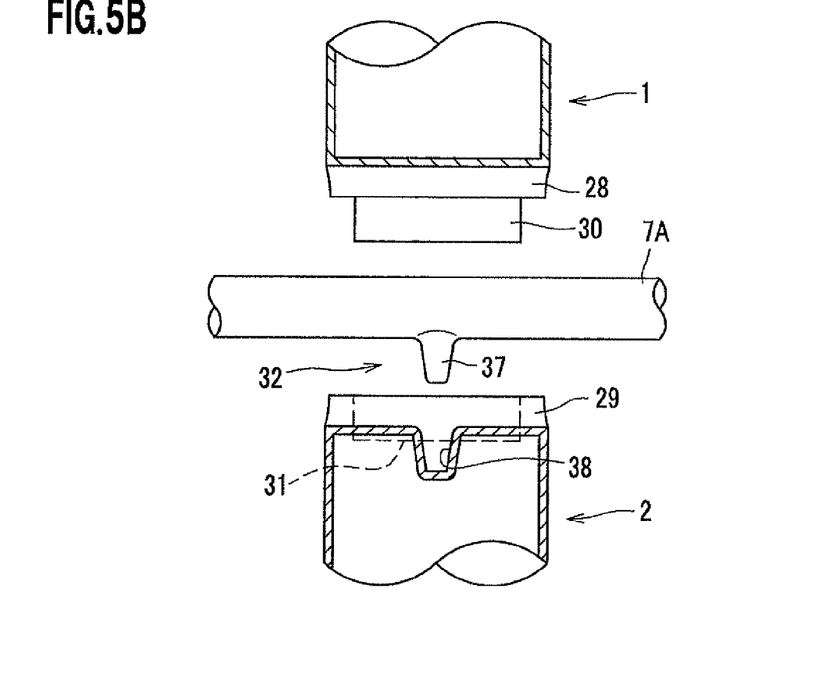

In an embodiment shown in FIGS. 5A and 5B, the lateral shift prevention means 32 is constituted of an engagement projection 37 formed on the outer circumferential surface of the tube 7A and an engagement hole 38 formed in the groove 29. The engagement projection 37 fits into the engagement hole 38 to position the tube 7A in place with regard to the axial direction thereof. The engagement hole 38 may be formed in the groove 28. Alternatively, the tube 7A may have a pair of engagement projections 37, and both the grooves 28 and 29 may have the engagement holes 38, respectively.

In such a case also, the fitting of engagement projection 37 and the engagement hole 38 facilitates temporary placement of the tube 7A on either one of the second support members 2.

Figure 6A:
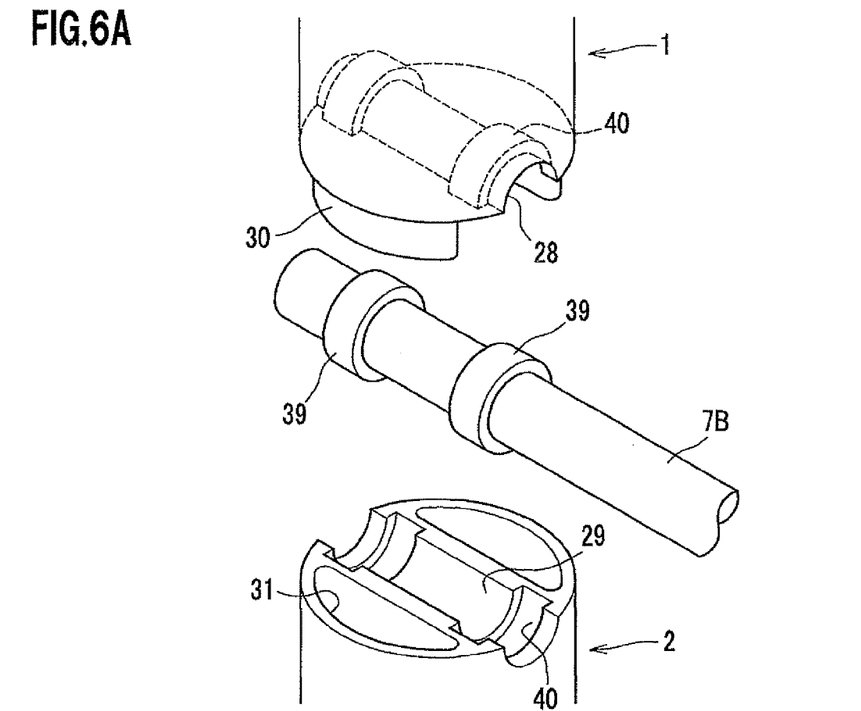
FIGS. 6A and 6B are views of yet another embodiment of the structure for coupling the first support member and the second support member to each other and the structure for clamping the built-in component, FIG. 6A being an external perspective view of the first support member and the second support member, FIG. 6B being a side view thereof.
Figure 6B:
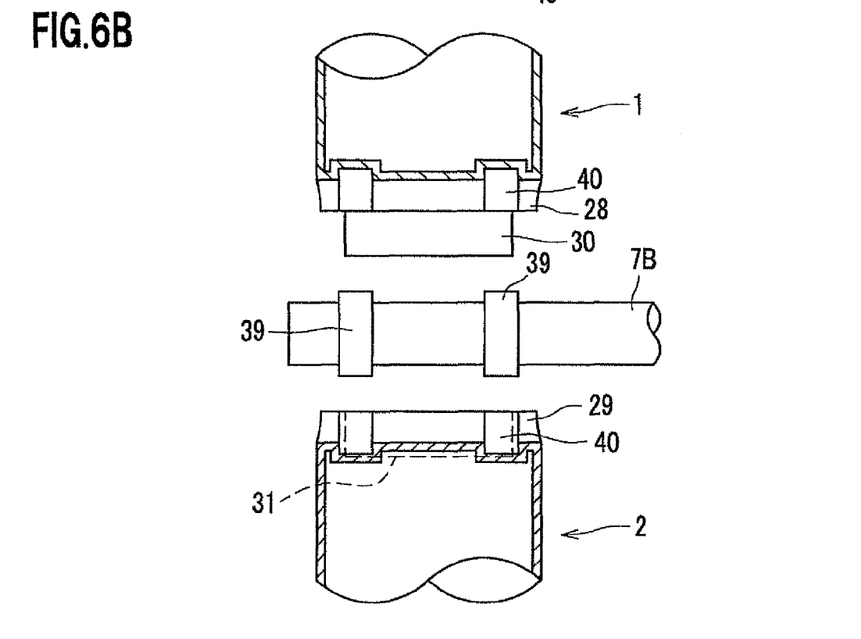

FIGS. 6A and 6B show an embodiment in which bearings 39 are provided between the built-in component 7 and each of the grooves 28 and 29. The built-in component 7 may be, for example, a rotating member such as the support shaft 7B shown in FIGS. 1A-1F. A pair of bearings 39 each have the shape of a ring and are provided around the support shaft 7B in a rotatable manner relative to the support shaft 7B. Further, trenches 40 are formed in each of the grooves 28 and 29. Accordingly, cases of the respective bearings 39 fit in the trenches 40 to position the support shaft 7B in place with regard to the axial direction thereof. The support shaft 7B is held by the bearings 39 in a rotatable manner around the axis thereof. As seen from the above, in the embodiment of FIGS. 6A and 6B, the lateral shift prevention means 32 is constituted of the cases of the bearings 39 and the trenches 40.

Figure 7A:
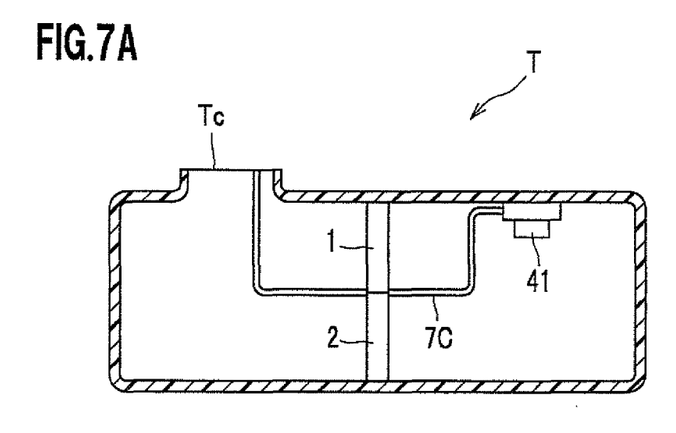
FIGS. 7A-7D are side views of modifications of the built-in component, the first support member and the second support member.

Now, referring to FIGS. 7A-7D, there will be described modifications of the built-in component 7, the first support member 1 and the second support member 2. FIG. 7A shows an embodiment in which the built-in component 7 to be clamped is a tube 7C communicating with a valve 41. The valve 41 is, for example, a fuel cut valve. The tube 7C has one end connected to the valve 41 and extends through the opening Tc to the other end located in the outside.

Figure 7B:
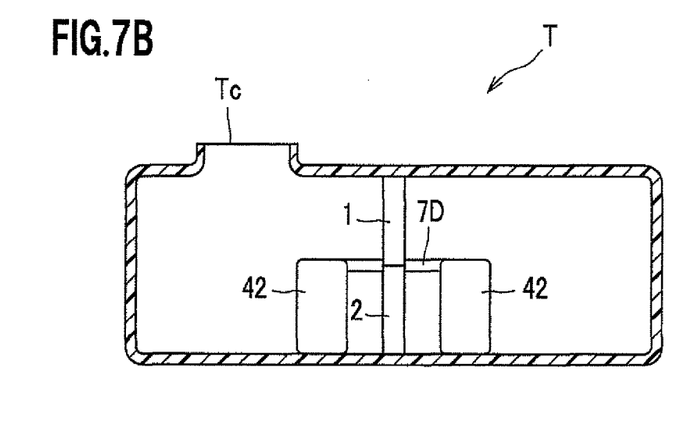

In FIG. 7B, the built-in component 7 to be clamped is embodied as a tube 7D for two canisters 42. The two canisters communicate with each other through the tube 7D. One of the canisters 42 communicates with the air in the outside, for example through piping, not illustrated, and the piping extends through the opening Tc to the outside.

Figure 7C:
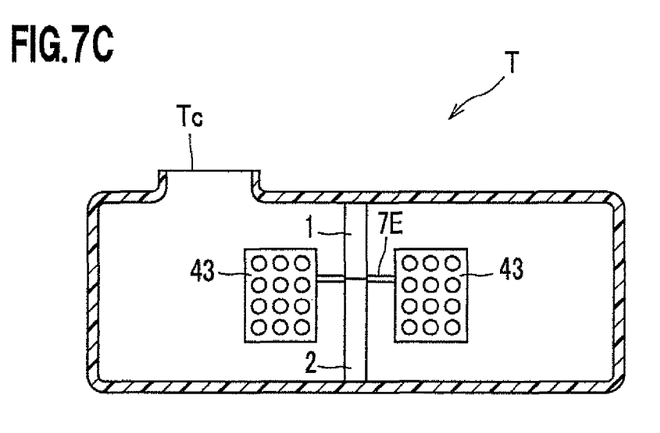

FIG. 7C is an embodiment in which the built-in component 7 to be clamped is constituted of a connecting shaft 7E for connecting two anti-wave plates 43. The anti-wave plates 43 function to control rippling of the fuel surface in the fuel tank T.

Figure 7D:
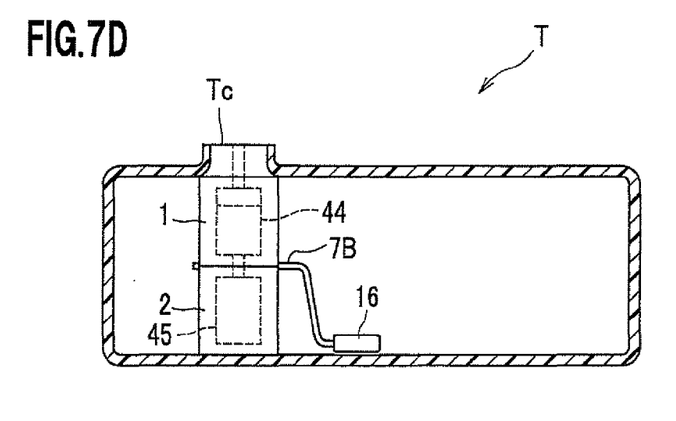

FIG. 7D is an embodiment in which a fuel pump 44, a strainer 45 and the like are incorporated inside the first support member 1 and the second support member 2 beforehand. The built-in component 7 to be clamped is, for example, the support shaft 7B shown in FIGS. 1A-1F.

Preferred embodiments of the present invention have been explained above, but the present invention is not limited to the disclosure by the accompanying drawings, and can be changed and modified in various forms within the scope and the spirit of the present invention. For example, the hollow container is not limited to the fuel tank but may be any that can be formed by clamp molding using a pair of mold pieces.

According to the structure and method for clamping the built-in component in the hollow container of the present invention, the built-in component can be stably secured to the hollow container via the first support member and the second support member that are coupled to each other.

The embodiments of the present invention have been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A structure for clamping a built-in component in a hollow container, the container being formed by clamp molding using a pair of a first mold piece and a second mold piece, the first mold piece being for forming a first half of the container, the second mold piece being for forming a second half of the container, the structure comprising:
    a first column-shaped support member welded to an inner wall surface of the first half of the container and having a first connection portion and a first clamp portion; and
    a second column-shaped support member welded to an inner wall surface of the second half of the container and having a second connection portion and a second clamp portion,
    wherein the built-in component is clamped between the first clamp portion and the second clamp portion in the state that the first connection portion and the second connection portion are coupled to each other, and
    wherein the first clamp portion and the second clamp portion are formed on top end surfaces of the first and second column-shaped support members.

2. The structure of claim 1, further comprising a lateral shift prevention means provided between the built-in component and at least either one of the first clamp portion and the second clamp portion for preventing lateral shift of the built-in component.

* * * * *